July 17, 1928.  
R. ROTHER  
AUTOMOBILE HOISTING DEVICE  
Filed Sept. 15, 1925      2 Sheets-Sheet 1

1,677,297

Inventor  
Rudolph Rother;  
By Clarence A. O'Brien  
Attorney

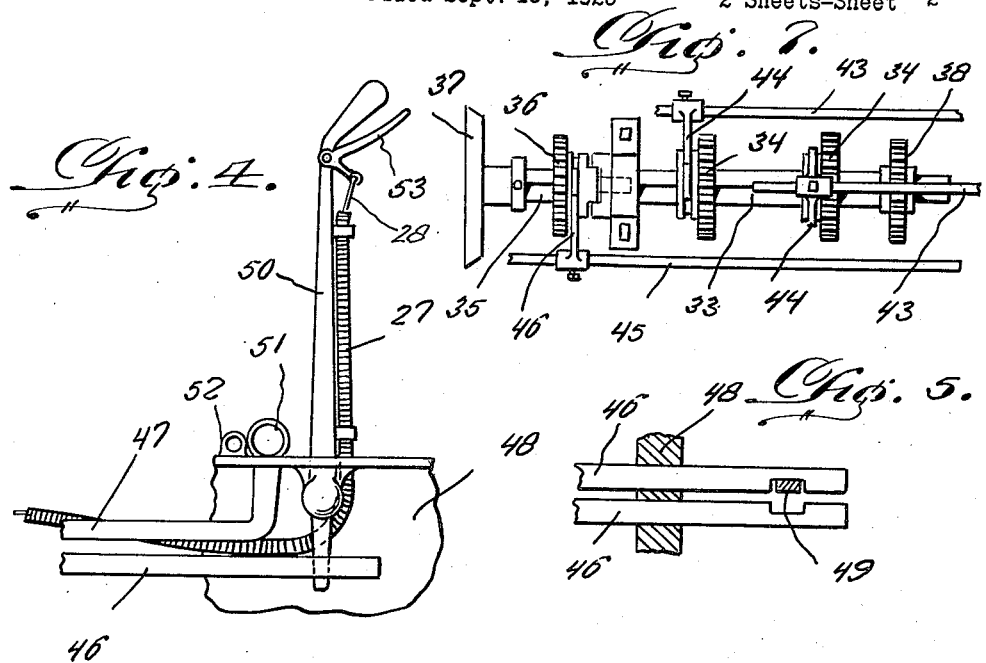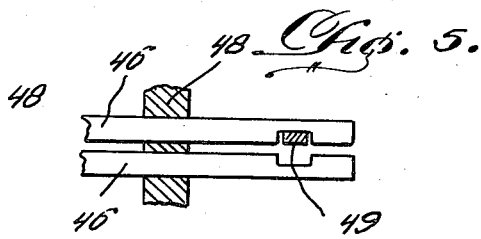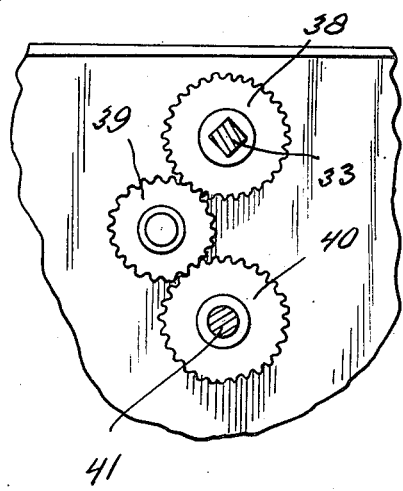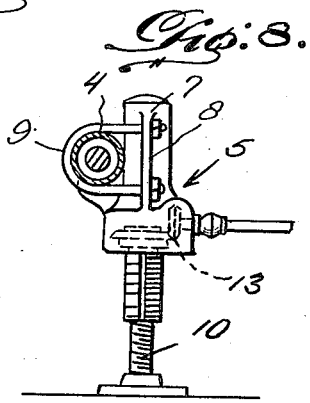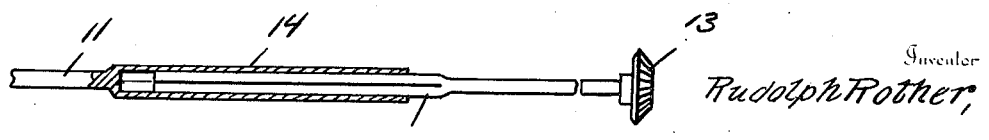

Patented July 17, 1928.                                                1,677,297

UNITED STATES PATENT OFFICE.

RUDOLPH ROTHER, OF TAMAQUA, PENNSYLVANIA.

AUTOMOBILE HOISTING DEVICE.

Application filed September 15, 1925. Serial No. 56,475.

This invention relates to an improved device or apparatus for raising and lowering automobiles, and it has more particular reference to a construction of this kind wherein four jacks are connected with the front and rear axles adjacent the wheels for raising either or both ends of the automobile to facilitate changing of tires, making repairs, or simply lifting the automobile off of the ground to relieve the tires of undue wear.

One object is to provide an apparatus of this kind wherein a support is extended crosswise of the central portion of the side bars of the automobile chassis, this providing a means for supporting an electric motor, transmission shafts and gearings, clutches and operating means therefor and other complemental details permitting power to be transmitted from the electric motor through the shafting to the jacks which are connected to the front and rear axles.

A more specific object is to provide a novel transmission mechanism including a housing with a plurality of gears therein adapted to be selectively intermeshed for supplying rotary power to the inner end portions of a pair of transversely disposed actuating shafts, these shafts being arranged in pairs so that they may be successively operated to raise and lower either end of the vehicle.

Another object is to provide two pairs of longitudinally disposed shafts which are adapted for directly operating the jacks, these two pairs of shafts being connected to right angularly disposed pairs driven directly from the gearing in the transmission, and indirectly from the electric motor employed to supply power to said transmission.

Other objects and advantages of the invention will become apparent from the following description and drawings.

In the accompanying drawings forming a part of this application and in which like numerals are employed to designate like parts throughout the same:—

Figure 3 is an enlarged detailed section taken approximately upon the plane of the line 3—3 of Figure 2.

Figure 4 is a detailed view of the gear shifting means.

Figure 5 is a detail of Figure 4 showing the lever operated rods.

Figure 6 is a view showing the extensible construction of the jack operating shafts.

Figure 7 is a section taken through the transmission mechanism showing the gear operating means.

Figure 8 is a detail view of one of the jacks per se.

Figure 1:
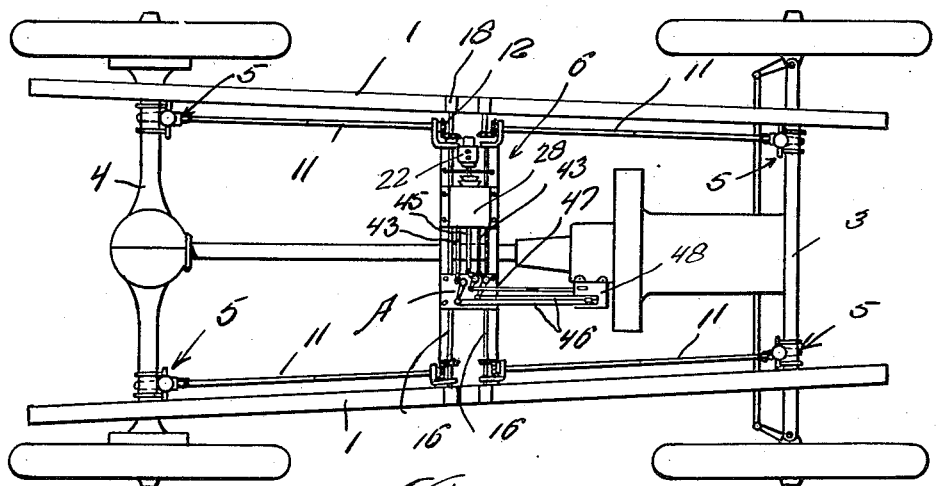
Figure 1 is a top plan view of an automobile chassis showing, in a diagrammatic way, the general plan of the structure.

Referring to the drawings in detail, the reference characters 1 designate the side bars of the wheel supported chassis of a conventional automobile. 3 designates the front axle and 4 the rear axle. The jacks are each represented by the reference character 5. As before stated there are four of these jacks and they are clamped upon the axles adjacent the ends or close to the inner sides of the wheels. The supporting structure upon the central part of the chassis bars is represented generally by the reference character 6.

Considering first the construction of the jacks, I would direct attention to Figure 8 wherein it will be seen that each one comprises a casing 7 provided with outstanding flanges 8 with which U-clamps 9 are connected. Otherwise the jacks are more or less conventional in design and embody the usual extensible standard 10 and other cooperating details.

Cooperating directly with the jacks are operating shafts 11. From Figure 1 it will be seen that there are two pairs of these shafts. There are beveled gears 12 and 13 on the opposite ends of the shaft. In practice each shaft will be provided adjacent its outer end with a socket 14 in which a section 15 of squared cross section is slidably mounted. It is on this section 15 that the beveled gear 13 is mounted. The section 15 is journaled in an appropriate bearing in the casing of the jack as shown in Figure 8 and the gear 13 meshes with the complemental gear of the jack structure.

As previously intimated the shafts 11 receive power from driven shafts 16. These shafts 16 are provided with beveled gears 17 meshing with the beveled gears 12. The outer ends of the shafts 16, which are at right angles to the shafts 11, are journaled in bearings 18 supported on the chassis bars. The inner ends of the shafts 16, however, are journaled in appropriate bearings on the aforesaid supporting structure 6.

Figure 2:
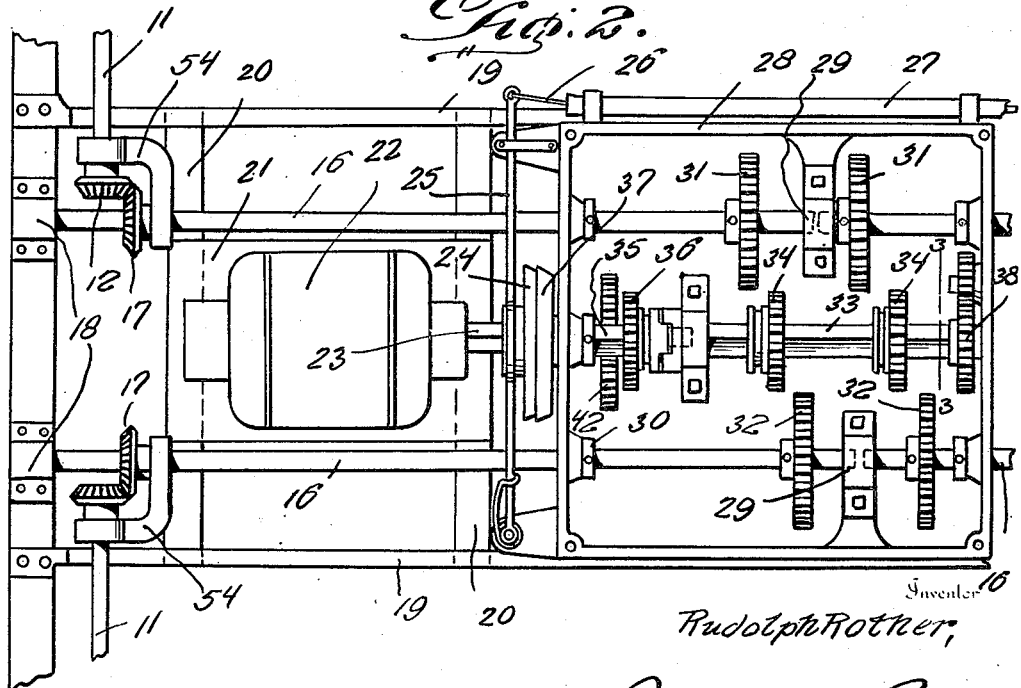
Figure 2 is an enlarged top plan view of the power supply and transmitting structure carried by the aforesaid central and transversely disposed supporting structure.

At this time I would direct special attention to the supporting structure 6 which is more plainly shown in Figure 2. This comprises mainly a pair of rigid cross bars 19 riveted or otherwise securely fastened at their outer ends to the intermediate portion of the chassis bars 1. Disposed adjacent one end of these bars 19 are cross pieces or hangers 20 carrying a base plate 21 on which the electric motor 22 is supported. The shaft of this motor is indicated at 23 and one element 24 of a clutch is slidably supported thereon. This element is provided with a grooved collar with which an operating device is connected. The operating device comprises, preferably, a pivotally mounted arm 25. At the pivoted end is a spring which serves to move the arm to a position for disengaging the clutch element 24. The intermediate portion of this arm is fashioned to carry a fork (not shown) which is engaged with the collar on the clutch element. Connected to the free end of this arm 25 is a flexible operating cable 26 passing through a flexible protecting casing 27, this casing being suitably mounted upon the supporting structure.

It will be noted that the motor and its immediate support is located at one side or end of the supporting structure. At the center is a transmission mechanism embodying an appropriate housing 28. The housing is suitably supported. On the interior of this housing are bearings 29 in which the inner ends of the aforesaid shafts 16 are journaled for rotation. The intermediate portions of the shafts are also journaled in bearings in the walls of the housing and stop collars 30 are mounted thereon rigidly to prevent endwise sliding of the shafts. On one shaft is keyed a pair of gears 31 while a similar pair 32 is keyed upon the opposed shaft. These gears are in a relation to permit them to be operated independently, or the gears 32 to be operated separately. In this way either of the jacks at the rear end of the vehicle may be elevated one after the other, or those of the front, whichever may be desired. Rotatably mounted in bearings between the shafts 16 is a shaft 33 which is preferably square in cross section. A pair of sliding gears 34 are carried by this shaft 33. In alignment with the shaft 33 and the aforesaid motor shaft 23 is an intermediate shaft 35 on which an independent gear 36 is slidably mounted. The shaft 35 is provided with a complemental clutch element 37 with which the aforesaid clutch element 24 cooperates. In addition an appropriate clutch is arranged to impart rotation from the shaft 35 to the shaft 33. At this time I would call attention to the presence of the stationary gear 38 on the opposite end of the shaft 33. This, as shown in Figure 3 is in constant mesh with an idler 39 which in turn is in mesh with a gear 40 keyed upon a shaft 41. The shaft 41 is located directly beneath the shaft 33 and has its opposite ends journaled in appropriate bearings. By referring to Figure 2 again it will be seen that there is a gear 42 on the opposite end of this shaft 41 with which the sliding clutch gear 36 is adapted to mesh when it is desired to reverse the direction of rotation of the shafts 16.

Appropriate means shown better in Figure 7 is employed for actuating the sliding gears 34 and 35. Referring to Figure 7 it will be seen that there is a pair of longitudinally shiftable rods 43 provided with adjustable forks 44. These forks are adapted to extend at the appropriate angle to engage with the grooved collars on the two gears 34. Then there is an additional longitudinally shiftable rod 45 carrying a similar fork 46 which engages with the grooved collar on the gear 36. This allows the two gears 34 to be operated simultaneously and the gear 36 to be operated independently.

Referring now to Figure 1 again it will be seen that the parts 43 and 45 extend out through the gear casing and are connected with pivotally mounted bell cranks. These bell cranks are operated by two closely spaced bars 46 and a spaced parallel bar 47. These bars extend to and are associated with a mounting 48 on the transmission housing. By referring to Figures 4 and 5 it will be seen that the opposed faces of the two bars 46 are formed with notches and that the lower end portion 49 of a shifting lever 50 is adapted to be located in these notches. The lever is pivotally mounted in any appropriate manner, preferably by a ball and socket joint and may be swung from side to side to be engaged with either one of the bars 46, after which it may be rocked longitudinally to shift that particular bar. The bar 47 has an upwardly directed portion formed with a finger ring 51. This bar is slidable in a slot formed in the top plate of the mounting 48. It is adapted to be grasped by the finger and slid back and forth. It may be moved backwardly a distance sufficiently far to align the ring 51 with the apertured lug 52 to permit a locking pin or the like to be passed therethrough to hold the bar in a locked position. While on Figure 4 I would direct attention to the fact that the forward portion of the flexible casing 27 and pull cable 28 is carried by this gear shifting lever 50. A finger piece 53 is pivotally mounted upon the handle of the lever and adapted to be rocked upon its pivot for actuating the cable. Attention is yet to be directed to the right angular brackets 54 as shown more plainly in Figure 2 for forming a connection and bearing between the shafts 11 and 16.

The operation of the device is as follows:

The electric motor 22 is set into operation for rotating the shaft 23. Now, the gear shifting lever 50 is actuated to operate either one of the bars 46. The manner in which this is accomplished is clearly obvious. As these bars 46 are connected with the forks 44, it is obvious that the gears 34 may be shifted into mesh with either the gears 31 or the gears 32 as desired. In this way the structure is set to successively operate either one of the two jacks at the rear or either one or both of the two jacks at the front according to the particular gears which are then intermeshed. In this way one jack may be raised to attend to the desired tire. In fact, the jacks may all be lifted one at a time to raise all four wheels off of the ground. The bar 47 is now shifted to engage the shaft 35 with the shaft 33 (see Figure 2). Now, by grasping the hand piece 53 and pressing across the handle of the lever 50, the cable 26 may be operated to throw in the clutch 24 to set the shaft 33 into rotation. It is to be assumed that during this operation the jacks are elevated. To reverse the movement of the jacks it is necessary to shift the gear 36 into mesh with the gear 42. This will impart a reverse rotation to the shaft 33 through the medium of the train of gears shown in Figure 3. By again throwing in the clutch the jacks will now be lowered. As soon as the hand grip 53 is released, the spring means associated with the aforesaid arm 25 will automatically disengage the clutch element.

It is believed that by considering the description in connection with the drawings persons skilled in the art to which the invention relates will be able to obtain a clear understanding of the same and therefore a more lengthy description is thought unnecessary.

While the preferred embodiment has been shown and described, it is to be understood that minor changes coming within the field of invention claimed may be resorted to if desired.

I claim:—

1. In a structure of the class described, a frame adapted to be supported transversely across the intermediate portion of a motor vehicle chassis, a motor arranged on the frame, the drive shaft of said motor extending longitudinally of the frame in the intermediate portion thereof, a pair of aligned longitudinally extending jack operating driven shafts arranged on one side of the drive shaft, an additional pair of longitudinally extending aligned jack operating driven shafts arranged on the opposite side of the drive shaft, bearings for the inner opposed ends of each pair of driven shafts, a gear keyed on the inner end portion of each of said driven shafts, gears slidable on the drive shaft for selective engagement with the gears on the driven shaft whereby any one of said jack operating driven shafts will be actuated or any pair of said shafts, and means for effecting the reverse rotation of said shaft.

2. In a structure of the class described, a frame adapted to be supported transversely across the intermediate portion of a motor vehicle chassis, a motor arranged on the frame, the drive shaft of said motor extending longitudinally of the frame in the intermediate portion thereof, a pair of aligned longitudinally extending jack operating driven shafts arranged on one side of the drive shaft, an additional pair of longitudinally extending aligned jack operating driven shafts arranged on the opposite side of the drive shaft, bearings for the inner opposed ends of each pair of driven shafts, a gear keyed on the inner end portion of each of said driven shafts, gears slidable on the drive shaft for selective engagement with the gears on the driven shaft whereby any one of said jack operating driven shafts will be actuated or any pair of said shafts, means for effecting the reverse rotation of said shaft, said means including an auxiliary drive shaft supported below the main drive shaft, gears arranged on the ends of said spaced shafts, and an idler gear supported on the frame and interposed between the gears on the main drive shaft and the auxiliary drive shaft for operatively connecting the same together.

In testimony whereof I affix my signature.

RUDOLPH ROTHER.